(12) United States Patent
Kelly

(10) Patent No.: US 10,743,643 B2
(45) Date of Patent: Aug. 18, 2020

(54) WIRE CLEANING BRUSH

(71) Applicant: Lawrence J. Kelly, Fairfield, OH (US)

(72) Inventor: Lawrence J. Kelly, Fairfield, OH (US)

( * ) Notice: Subject to any disclaimer, the term of this patent is extended or adjusted under 35 U.S.C. 154(b) by 51 days.

(21) Appl. No.: 15/999,222

(22) Filed: Aug. 17, 2018

(65) Prior Publication Data
US 2020/0054119 A1 Feb. 20, 2020

Related U.S. Application Data

(60) Provisional application No. 62/546,774, filed on Aug. 17, 2017.

(51) Int. Cl.
| | |
|---|---|
| *A46B 3/04* | (2006.01) |
| *B08B 1/00* | (2006.01) |
| *A46B 15/00* | (2006.01) |
| *A46B 5/00* | (2006.01) |
| *A47J 37/07* | (2006.01) |

(52) U.S. Cl.
CPC .............. *A46B 3/04* (2013.01); *A46B 5/0025* (2013.01); *A46B 5/0037* (2013.01); *A46B 15/0081* (2013.01); *A47J 37/0786* (2013.01); *B08B 1/002* (2013.01); *B08B 1/005* (2013.01); *A46B 2200/3073* (2013.01); *A46B 2200/3093* (2013.01)

(58) Field of Classification Search
CPC ....... A46B 3/04; A46B 5/0025; A46B 5/0037; A46B 13/08; A46B 15/0081; A47J 37/0786; B08B 1/002; B08B 1/005
See application file for complete search history.

(56) References Cited

U.S. PATENT DOCUMENTS

| | | | | |
|---|---|---|---|---|
| 1,375,681 | A * | 4/1921 | Dennin | A46B 5/0033 132/313 |
| 5,373,600 | A * | 12/1994 | Stojanovski | A47L 13/34 15/111 |
| 2006/0101599 | A1 * | 5/2006 | Lane | A46B 15/0055 15/113 |
| 2017/0340188 | A1 * | 11/2017 | Rylands | A47L 13/08 |

* cited by examiner

*Primary Examiner* — Shay Karls
(74) *Attorney, Agent, or Firm* — William Rambo

(57) ABSTRACT

The present wire brush is adapted to clean a grill grate and basically comprises and outer housing, a grate-engaging flange, a flexible bristle-receiving retainer and a plurality of wire bristles. The outer housing has upper and lower portions. The grate-engaging flange extends from the lower portion of the housing in generally perpendicular relation thereto. The flexible retainer is disposed in the upper portion of the housing. The bristles have upper portions embedded in the retainer and grate-engaging free ends that extend no more than one-half inch beyond the grate-engaging flange.

9 Claims, 5 Drawing Sheets

WIRE CLEANING BRUSH

RELATED APPLICATION

The present non-provisional application claims the priority of U.S. Provisional Application No. 62/546,774 filed Aug. 17, 2017 bearing the same title as above.

BACKGROUND

The present invention relates to wire bristle brushes and more particularly to those used for cleaning food grilling surfaces and the like.

A barbeque grill cook surface or grate is ordinarily made of spaced apart metal rods or bars that support the food a fixed distance from the heat source. The grate rods may be fabricated from welded wire, cast metal or formed/perforated metal. Prior art wire bristle brushes were made from wood or ridged plastic with an elongated handle with wire bristles.

When preparing the grill for cooking, the user would remove the food residue from prior use with scrapers and/or a wire brush. As illustrated in FIG. 1, a prior art brush typically had wire bristles 10 that were retained or attached to a base 12 formed from rigid material such as plastic or wood. The bristles were either molded in place, pressed into holes, or otherwise affixed. When cleaning with a conventional wire brush, the user would press the bristles into the open spaces 14 in the grill surface and move the brush laterally across the surface. This pressure and movement caused the wire bristles to bend as the brush moved laterally across the grill grate surface. This bending of the bristles mechanically removed the residue from the sides and top surfaces of the grill grate 16.

As illustrated in FIG. 2, bending the bristles in the above-described conventional wire brush caused the individual bristle wires to exceed elastic limits of the wire, fatigued the material and permanently bent or curled them. This repeated bending may also have caused the wire to fatigue and break, allowing the detached bristle to fall onto the grate where these bristles could have attach themselves to the food. Also, the pressure applied to the brush by the user was arbitrary. The user might have felt that more pressure would improve cleaning. However, this additional pressure caused the bristles to penetrate well beyond the top or cooking surface, deep into the open area 14 of the cooking grate. In this condition, the top surface of the grill grate 16 was relatively close to the base 12 where the bristles were retained. Brushing across the surface caused a concentrated bend that exceeded safe stress levels (for bending) and caused breaking of the individual bristles with repeated cycling. This condition was further aggravated by bending the bristles in multiple directions.

In July 2012, the US Centers for Disease Control and Prevention issued a warning about the dangers of ingesting the wires that break off grill brushes. https://www.cdc.gov/mmwr/preview/mmwrhtml/mm6126a4.htm. "The severity of injury ranged from puncture of the soft tissues of the neck, causing severe pain on swallowing, to perforation of the gastrointestinal tract requiring emergent surgery," according to the report. To combat the wire bristle issue specifically, that CDC report recommended everyone from health care professionals to manufacturers of wire grill-cleaning brushes to retailers to the public be aware of the issue.

SUMMARY OF THE INVENTION

The present wire brush is adapted to clean a grill grate and basically comprises and outer housing, a grate-engaging flange, a flexible bristle-receiving retainer and a plurality of wire bristles. The outer housing has upper and lower portions. The grate-engaging flange extends from the lower portion of the housing in generally perpendicular relation thereto. The flexible retainer is disposed in the upper portion of the housing. The bristles have upper portions embedded in the retainer and grate-engaging free ends that extend no more than one-half inch beyond the grate-engaging flange.

DETAILED DESCRIPTION OF ILLUSTRATIVE EMBODIMENTS

The novel wire cleaning brush disclosed below is aimed at eliminating the bristle breakage problem by limiting the penetration depth of the bristles so that deflection is minimized and controlled, and by minimizing or even eliminating bending of the bristles.

Figure 1:
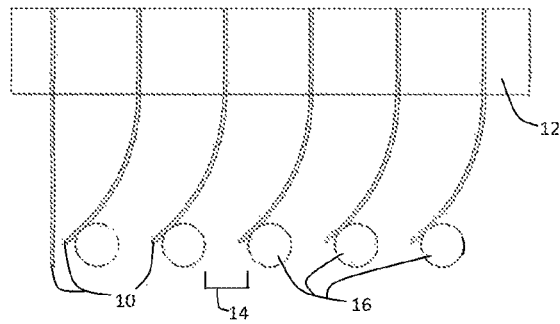
FIG. 1 is a side sectional view of a prior art wire brush engaging a cooking grate.
Figure 2:
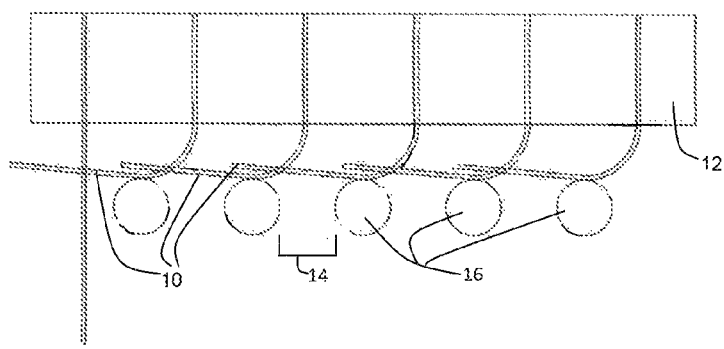
FIG. 2 is a side sectional view of the prior art brush engaging the grate more forcefully.
Figure 3:
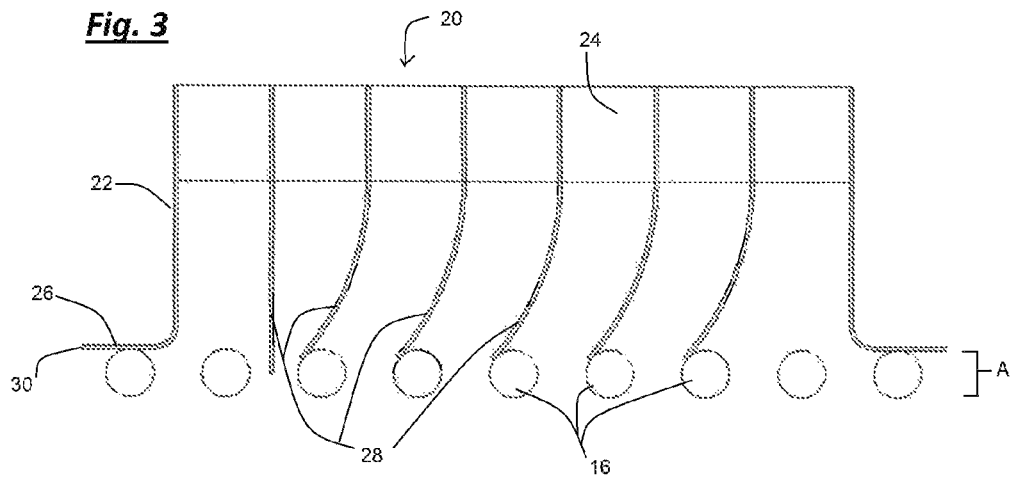
FIG. 3 is a side sectional view of a first embodiment of a novel wire cleaning brush engaging the grate.

As illustrated in FIG. 3, the present brush, generally designated 20, may employ a housing 22 extending downwardly from a bristle-receiving retainer 24. The housing 22 may be formed with a generally planar, outwardly flared grill-engaging flange 26 at its lower end. The flange 26 may be disposed a distance from the bristle retainer 24 that is less than the downward extent of the bristles 28. The position of the flange 26 is designed to limit the amount of bristle penetration beyond the upper surface of a grate 16, thereby reducing or preventing bristle breakage. This optimum penetration dimension is approximately ½ the thickness A of the cooking grate. Advantageously, a free edge 30 of the flange 26 may serve as a scraper to clean residue from the upper surface of the grill grate 16. Preferably, the housing 22, the bristle retainer 24 and the flange 26 are generally circular to permit the flange 26 to move relatively easily over irregularities in the grill grate surface. By limiting the penetration or engagement of the bristles 28 with the grill grate 16, there will be less deflection of the bristles and therefore lower stress/fatigue along the bristle length and at their attachment points with the retainer 24 where the stress is the highest.

Figure 4:
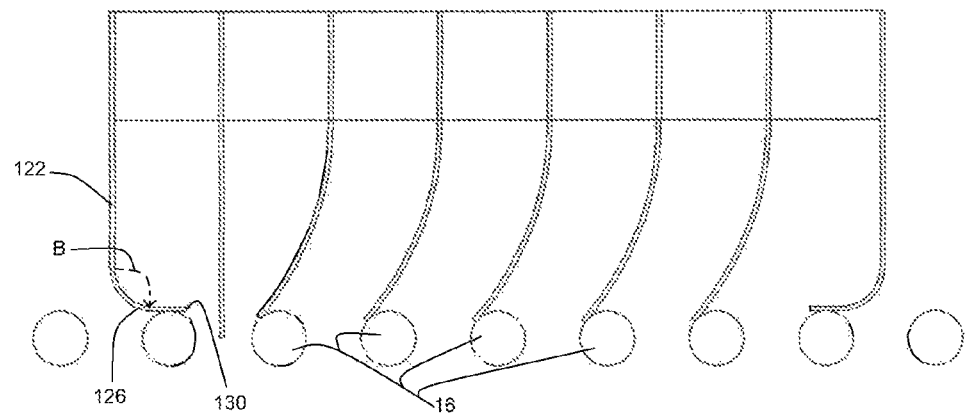
FIG. 4 is a side sectional view of a second embodiment of the brush engaging the grate.

As illustrated in FIG. 4, the housing 122 may be modified by extending the flange 126 inwardly, rather than outwardly. It is believed that the scraping effect of the free end 130 is improved in this configuration. Likewise, a gentle angle or radius B enables the inwardly extending flange 126 to comply with irregularities in the surface of the grate 16. Advantageously, residue scraped off the grate by the free end 130 may be contained within the housing 122.

Figure 5:
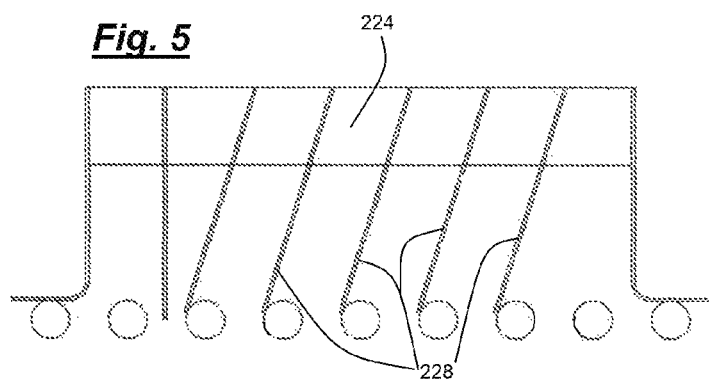
FIG. 5 is a side sectional view of a third embodiment of the brush engaging the grate.

Any bending of the bristles, however minimal, may eventually result in fatigue failure of the bristle. As shown in FIG. 5, to eliminate bristle bending substantially entirely, the bristle retainer 224 may be formed from an elastomeric or resilient, deformable material such as polyurethane. The retainer 224 may then act as a spring with the understanding that the spring force is controlled by the deformation of the resilient material (and therefore the material selected). This deflection and the pressure of the individual bristles is a result of deformation of the elastic material, rather than bending of the wire bristles. Also, the bristles 228 could be made from a material that has enough thickness/diameter C to limit or prevent bending or flexing and thereby assist in reducing or preventing fatigue and breakage.

Figure 6:
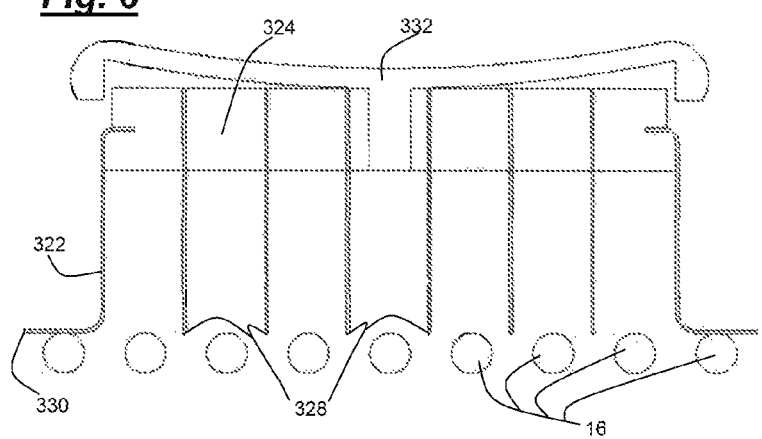
FIG. 6 is a side sectional view of a fourth embodiment of the brush engaging the grate.
Figure 7:
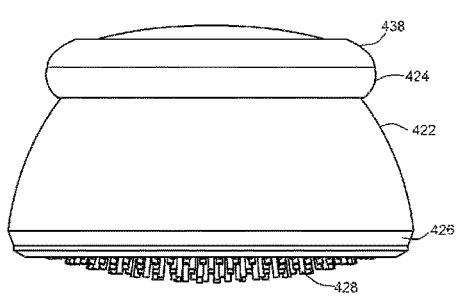
FIG. 7 is a side view of a fifth embodiment of the present brush.

With reference to FIG. 6, it has been determined through testing that the most effective grate residue removal is done by the free ends of the bristles 328 as they move over the grate 16. Since the grate is somewhat uneven, it is desirable to provide the bristles with varied penetration depth. Varied penetration is desirable, so the free ends of the bristles contact the grill grate at points all along the desired surface to be cleaned. Ideally, the ends of the bristles for this brush assembly, while in a resting state, are co-planar with the flange 326. When the user presses on a top knob 332 while cleaning, the bristles are moved into engagement with the grill grate. When the top is released, the ends of the bristles are co-planar with the surface defined by the scraper edge.

The resilient retainer 324 in which the bristles are embedded functions as a spring to allow varied penetration when the knob 332 is pressed by the user. Pressure on the top cap causes the elastic bristle retainer to assume a spherical shape that engages the bristles with the grate. This movement causes the ends of the bristles to assume a shallow domed surface (for a circular skirt). So, when moving the brush laterally across the surface, the ends of the wire bristles (that meet the grate) are at varied engagement depths from 0 to approximately ½ the depth of the grate. As described above, this action improves cleaning and also improves the ergonomics of the cleaning task. The more bristles engaged and the deeper engagement (with the grill grate), will result in an increased effort when moving across the surface. So cleaning light residue would require less pressure and cleaning difficult spots would require more pressure. This effectively replicates the user experience of cleaning a common (indoor) cooking item like a skillet. The resilient retainer 324 also evenly distributes pressure on the outer flange 326 and allows the flange and bristles to level the bristle ends and the free end 330 of the flange with the top surface of the grate 16 regardless of how evenly the top handle is pressed (i.e. pressed off center). It is understood that the upper knob 332 could be replaced by a handle.

Figure 8:
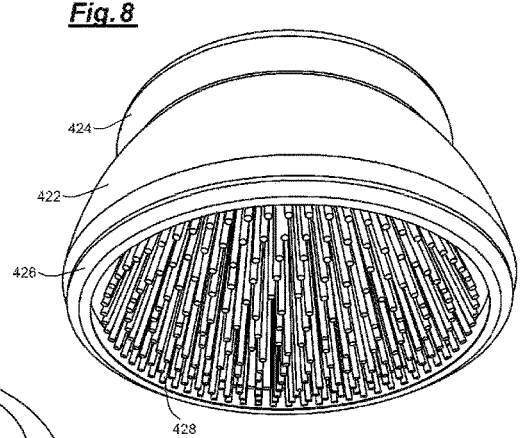
FIG. 8 is a perspective view of the fifth embodiment from below.
Figure 9:
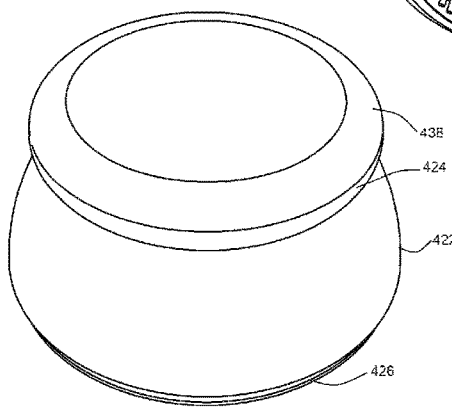
FIG. 9 is a perspective view of the fifth embodiment from above.
Figure 10:
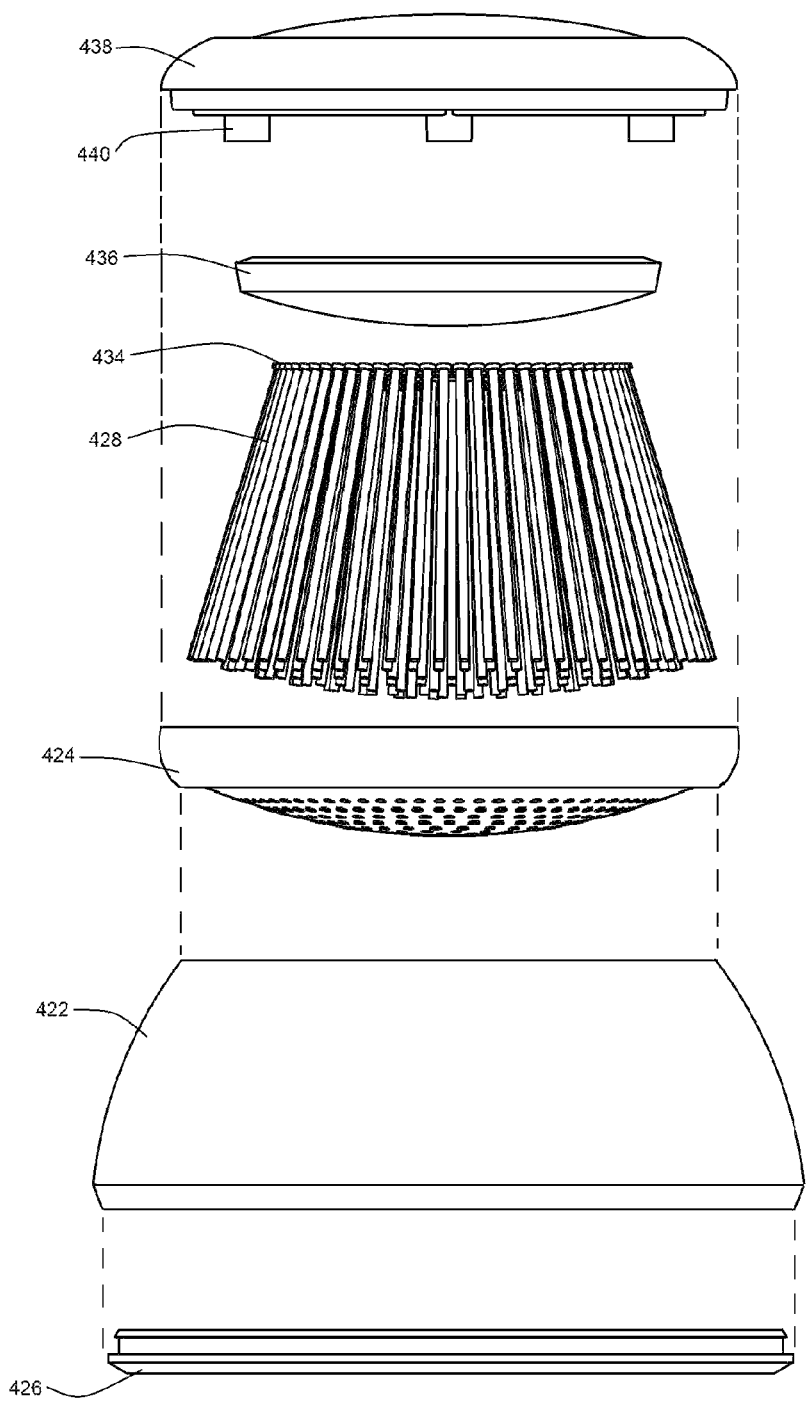
FIG. 10 is an exploded view of the components of the fifth embodiment illustrated in FIGS. 11-13.
Figure 11:
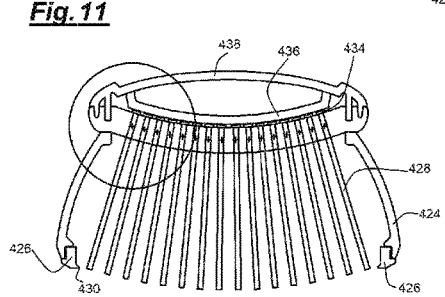
FIG. 11 is a sectional view of the fifth embodiment taken along line 11-11 of FIG. 7.
Figure 12:
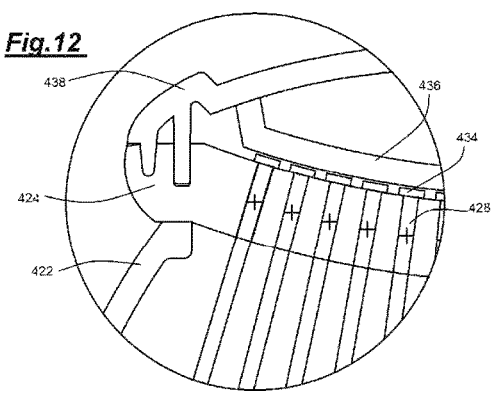
FIG. 12 is an enlarged view of a detail shown in FIG. 11.
Figure 13:
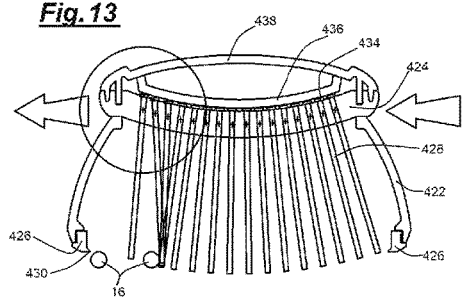
FIG. 13 is a sectional view of the fifth embodiment similar to FIG. 11 and particularly illustrates the wire bristles engaging a grill grate.

FIGS. 7-14 illustrate a fifth embodiment of the present wire brush. A ring-shaped scraper flange 426 corresponds to the flanges 26, 126, 326 shown in FIGS. 3, 4 and 6. It may be formed from aluminum alloy or other heat resistant material and provided with an inwardly disposed sharp edge 430 (FIGS. 8, 11, 13). During use, the scraper 426 is in contact with the grate. The scraper 426 may be attached to a lower edge of a cup-shaped housing 422. The housing 422 may be formed from impact resistant polymeric material. It establishes and limits the penetration depth of the bristles with the grate. An elastic block or bristle retainer 424 may be formed from molded material that has holes molded in to receive the bristles. The bristles are inserted from the top of the retainer, which holds them in place while providing mechanical resistance to lateral bristle deflection. The bristles 428 may be formed from stainless steel wire approximately 0.030 inch in diameter. The bristles may be formed with an enlarged upper end or head 434 that prevents them from being pulled out of the retainer 424. A backing plate 436 may be provided to bear against the bristle head 429. The backing plate serves to prevent the bristles from pushing through the retainer 424 and to keep them from bending. A cap 438 may be formed from polymeric material and serve as a handle for the user to grasp. Screws (not shown) may be threaded through a flange in the housing and retained in screw bosses 440 in the cap 438 to assemble the components. When assembled, the free ends of the bristles 428 extend below the scraper flange 426 a variable distance. As shown in FIG. 13, when the user applies the brush to the grate 16, downward pressure on the cap 438 flexes the retainer 434 and causes the free ends of the bristles to engage the upper and side surfaces of the grate.

By controlling grate/bristle engagement depth, deflection of the bristle is controlled. Limiting the deflection of the bristle results in limiting the bending stress and stress at the support of the bristles. This will maintain stresses to "safe" levels for longer bristle life (without breaking).

Embedding the bristles in a generally elastomeric material largely eliminates bending of the bristles caused by deflection. Embedding the bristles also allows control of the pressure (force) between the individual bristle and the grate. The thickness of the bristle, the depth to which the bristle is embedded in the resilient material, the bristle length and material properties (such as durometer) are all factors in minimizing the pressure (force) between the bristle and the grate to levels sufficient to remove debris.

Figure 14:
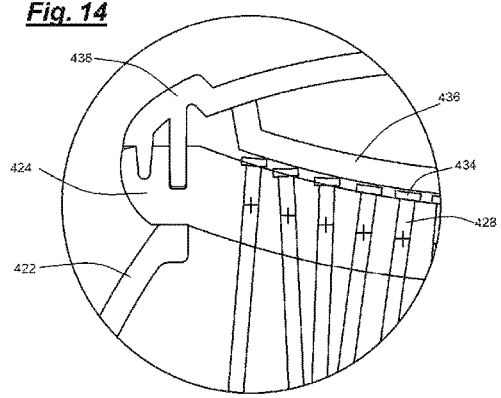
FIG. 14 is an enlarged view of a detail shown in FIG. 13.

As illustrated in FIGS. 13 and 14, embedding the bristles in a resilient, generally elastomeric material also causes each bristle to affect the bristles next to it. Deflection of a single bristle results in local deformation of the elastic material and engagement with the grates. This is seen primarily at the outer perimeter where the bristles are not fully engaged with the grate.

When using the brush, downward pressure on the brush causes engagement of the bristles and the grate. The greater the pressure on the top of the brush, the greater engagement between the grate and the bristles. This engagement is limited of course. This provides an ergonomic feedback that users are familiar with. Like using a scouring pad or steel wool to scrub a frying pan (example).

The bristle penetration depth is limited by the scraper flange 426, which is in contact with the top surface of the grate when in use. This terminal edge scrapes food debris from the top of the grates while the bristles remove food debris from the sides of the grate. The sharpened edge is located on the inside of the metal flange so that food debris (removed by scraping) is contained within the housing. Also, the outer surface of the metal flange is smoothed or radiused so that it will ride over grates that are uneven and uneven grates will not "catch" on the inside of the sharpened flange end.

The invention claimed is:

1. A wire brush adapted to clean a grill grate having a selected thickness, said brush comprising:
   an outer housing having upper and lower portions;
   a grate-engaging flange extending from the lower portion of the housing in generally perpendicular relation thereto;
   a flexible bristle-receiving retainer disposed in the upper portion of the housing;
   a plurality of wire bristles having upper portions embedded in the retainer and grate-engaging free ends, said free ends extending no more than one-half inch beyond the grate-engaging flange; and
   a top movably mounted on the outer housing, said top being connected to the flexible bristle retainer to change the positions of the free ends of the bristles relative to the grate-engaging flange.

2. The wire brush according to claim 1, wherein the free ends of the wire bristles extend beyond the grate-engaging flange approximately one-half of the thickness of the grill grate.

3. The wire brush according to claim 1, wherein the grate-engaging flange is adapted to scrape debris from an upper surface of the grill grate.

4. The wire brush according to claim 1, wherein the outer housing, the bristle-receiving retainer and the grate-engaging flange are generally circular.

5. The wire brush according to claim 1, wherein the grate-engaging flange projects outwardly from the housing.

6. The wire brush according to claim 1, wherein the grate-engaging flange projects inwardly from the housing.

7. The wire brush according to claim 1, wherein the grate-engaging flange is ring-shaped and is attached to a lower end of the housing.

8. The wire brush according to claim 1, wherein the bristles are formed with enlarged heads disposed on an upper surface of the flexible bristle retainer.

9. The wire brush according to claim 8, wherein a backing plate is disposed between the top and the enlarged heads of the bristles.

* * * * *